US006182778B1

(12) United States Patent
Henshaw et al.

(10) Patent No.: US 6,182,778 B1
(45) Date of Patent: *Feb. 6, 2001

(54) MATERIALS HANDLING VEHICLE HAVING AN EXPANDED OPERATOR'S COMPARTMENT

(75) Inventors: Robert J. Henshaw, Evanston, IL (US); Randall D. Plaugher, Wapakoneta; Patrick A. Tebbe, Anna, both of OH (US)

(73) Assignee: Crown Equipment Corporation, New Bremen, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/140,516

(22) Filed: Aug. 26, 1998

Related U.S. Application Data (60) Provisional application No. 60/057,137, filed on Aug. 28, 1997, and provisional application No. 60/058,102, filed on Sep. 5, 1997.

(51) Int. Cl.$^7$ ............................... B62D 25/20; B66F 9/06
(52) U.S. Cl. ..................... 180/89.12; 180/291; 180/90.6; 187/222; 414/914; 296/190.1
(58) Field of Search ..................... 280/830, 92; 180/291, 180/89.1, 89.11, 89.12, 89.13, 89.16, 89.17, 89.18, 90.6, 908; 187/222, 224; 414/914, 661, 917; 296/63, 64, 190.1

(56) References Cited

U.S. PATENT DOCUMENTS

| | | | |
|---|---|---|---|
| 2,564,002 | * 8/1951 | Gibson | ................................... 180/21 |
| 2,789,648 | * 4/1957 | Huffman | .......................... 180/908 X |
| 3,014,344 | * 12/1961 | Arnot | ............................... 187/224 X |
| 3,394,770 | * 7/1968 | Goodacre | ............................. 187/224 |
| 3,424,475 | 1/1969 | Gibson | ................................. 280/86.1 |
| 3,469,858 | 9/1969 | Goodacre | ....................... 280/93.506 |
| 3,722,613 | * 3/1973 | DePriester et al. | ......... 280/93.505 X |
| 4,090,578 | 5/1978 | Shinoda et al. | ...................... 280/830 |

FOREIGN PATENT DOCUMENTS

| | | |
|---|---|---|
| 1 755 971 | 4/1973 | (DE) . |
| 1326436 | 3/1962 | (FR) . |

* cited by examiner

Primary Examiner—Eric Culbreth
Assistant Examiner—F. Zeender
(74) Attorney, Agent, or Firm—King and Schickli, PLLC (57) ABSTRACT

The motor compartment of a fork lift truck is modified so that the operator's feet extend into the space normally required by the motor compartment. A motor support structure is installed between the traction motor and the gear box which is connected to the steerable, powered wheel. The motor support structure occupies a smaller space than the traction motor itself, thus increasing the space available to the operator's compartment, at least in a limited vertical location adjacent to the support. With the traction motor out of the way, sufficient space for elevated pedals is provided, thus providing the operator ample space to operate the truck while seated. A battery compartment and hydraulic system of the truck are positioned adjacent to one another and ahead of the operator's compartment/motor compartment. In this way, the battery compartment and hydraulic system are positioned such that they are clear of the operator's compartment.

14 Claims, 9 Drawing Sheets

MATERIALS HANDLING VEHICLE HAVING AN EXPANDED OPERATOR'S COMPARTMENT

CROSS REFERENCE TO RELATED APPLICATIONS

This application claims the benefit of U.S. Provisional Patent Applications No. 60/057,137 filed Aug. 28, 1997 and entitled EXPANDED OPERATOR'S COMPARTMENT FOR LIFT TRUCK; and, No. 60/058,102 filed Sep. 5, 1997 and entitled EXPANDED OPERATOR'S COMPARTMENT FOR LIFT TRUCK which are incorporated herein by reference.

BACKGROUND OF THE INVENTION

The present invention relates in general to materials handling vehicles and, more particularly, to an expanded operator's compartment for such vehicles which facilitates operation of the vehicles, particularly in a seated position. While the present invention is generally applicable to materials handling vehicles, it is described herein with reference to a fork lift truck, specifically a rider reach truck, for which it is particularly applicable and initially being used.

An important consideration in the design of fork lift trucks, such as a rider reach truck, is the width of the truck which is limited, to a great extent, by the width of existing aisles in warehouses. Generally speaking, fork lift trucks are preferably no wider than approximately 48 inches in order to provide ample room for turning the trucks, and in some cases, for two trucks to pass one another in an aisle. However, when the operator is provided with the option of sitting while operating the truck, the operator's compartment must be made wide enough to permit the operator to sit comfortably within the compartment.

For example, in the case of a rider reach truck in which the operator can stand, perch or sit, the operator's compartment must be made wide enough to permit the operator's feet to be placed on elevated auxiliary pedals when the operator is seated so that the operator's eyes can be maintained at substantially the same level as when the operator is standing or perching. Such a rider reach truck is disclosed in U.S. Provisional Patent Applications No. 60/057,375 filed Aug. 28, 1997 and entitled THREE POSITION SEAT ASSEMBLY FOR LIFT TRUCK; and, No. 60/058,101 filed Sep. 5, 1997 and entitled THREE POSITION SEAT ASSEMBLY FOR LIFT TRUCK which are incorporated herein by reference.

Since the total width of the truck is the sum of the motor compartment and the operator's compartment, it follows that the operator's compartment cannot be expanded without encroaching on the space occupied by the motor compartment, and particularly the space occupied by the traction motor of the truck. Accordingly, there is a need for an expanded operator's compartment for a fork lift truck, such as a rider reach truck, which comfortably accommodates a seated operator yet is compatible with the motor compartment of the truck. Preferably, a battery compartment and hydraulic system of the truck would be positioned such that they do not encroach on such an expanded operator's compartment.

SUMMARY OF THE INVENTION

This need is met by the invention of the present application wherein the motor compartment of a fork lift truck is modified so that the operator's feet extend into the space normally required by the motor compartment. This is accomplished by installing a motor support structure between the traction motor and the gear box which is connected to the steerable, powered wheel. The motor support structure occupies a smaller space than the traction motor itself, thus increasing the space available to the operator's compartment, at least in a limited vertical location adjacent to the support. With the traction motor out of the way, sufficient space for elevated pedals is provided, thus providing the operator ample space to operate the truck while seated. It is also preferred to position a battery compartment and hydraulic system of the truck adjacent to one another, ahead of the operator's compartment and the motor compartment. In this way, the battery compartment and hydraulic system are positioned such that they are clear of the operator's compartment.

It is, thus, an object of the present invention to provide a materials handling vehicle which has an expanded operator's compart such that the operator may sit comfortably in addition to perching or standing while operating the vehicle.

Other objects and advantages of the invention will be apparent from the following description, the accompanying drawings and the appended claims.

DETAILED DESCRIPTION OF THE INVENTION

Figure 1:
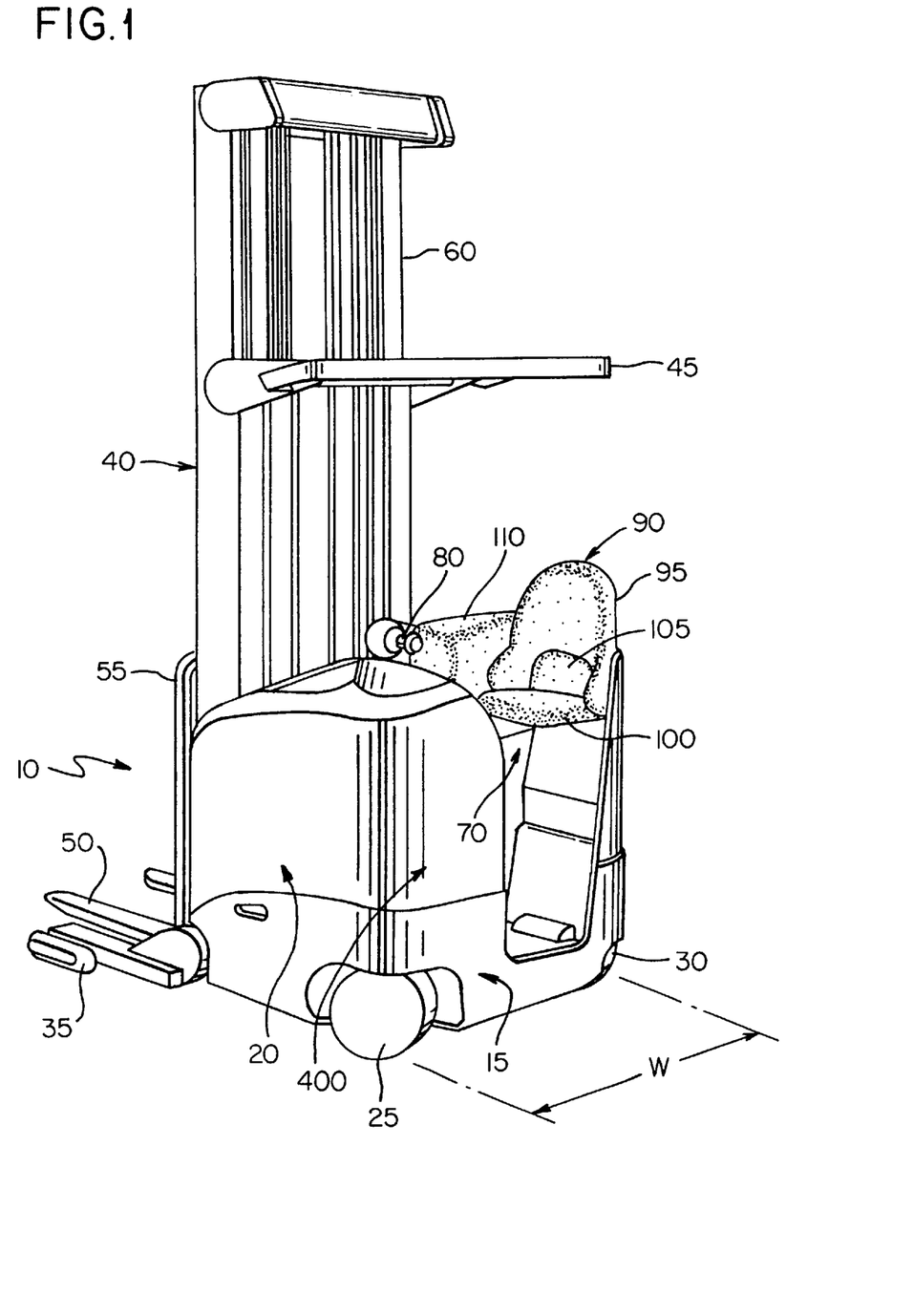
FIG. 1 is a perspective view showing a rider reach truck incorporating an expanded operator's compartment in accordance with the present invention.
Figure 2:
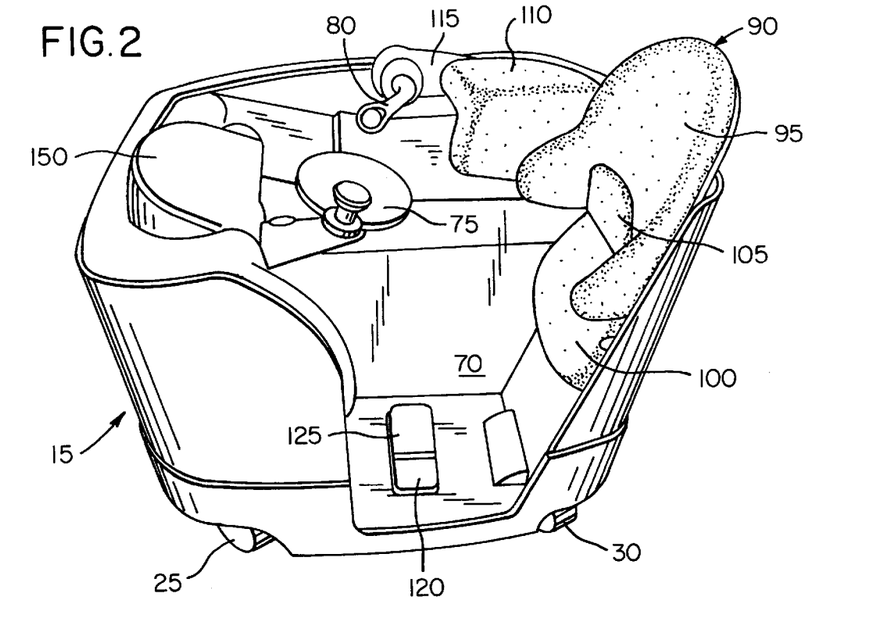
FIG. 2 is a perspective view of the power unit of the rider reach truck of FIG. 1 showing the various components included in the expanded operator's compartment.
Figure 3:
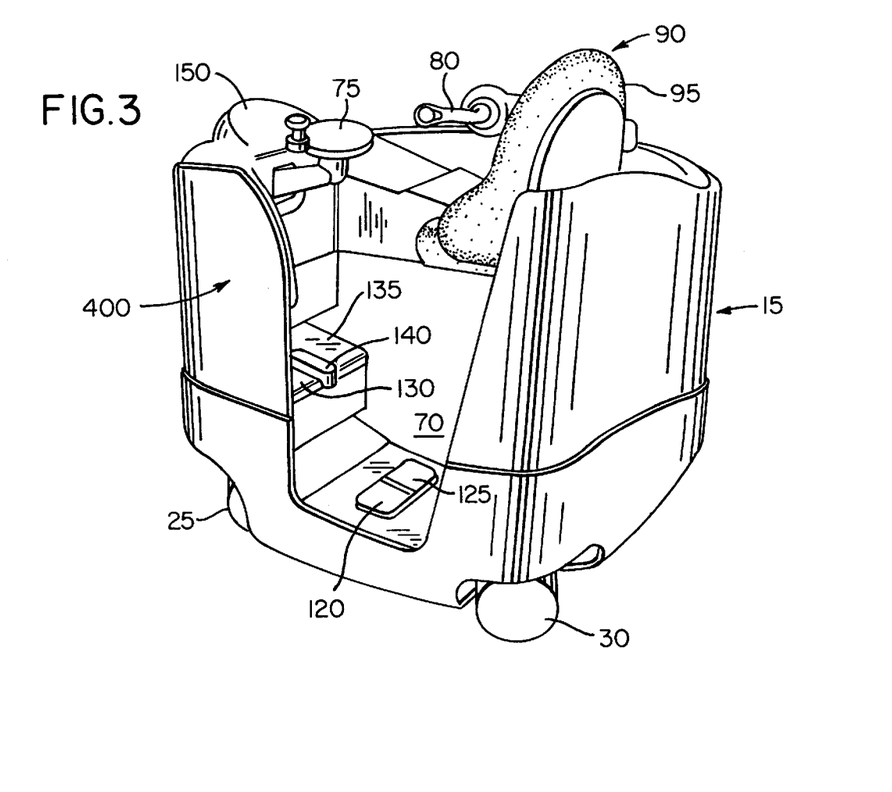
FIG. 3 is another perspective view of the expanded operator's compartment showing elevated foot pedals which extend into a motor compartment of the power unit of the rider reach truck of FIG. 1.

Reference will now be made to FIGS. 1–3 which show a rider reach truck 10 that includes a power unit 15 including an operator's compartment 70, a battery compartment 20, and a motor compartment 400. A battery in the battery compartment 20 (FIG. 10) supplies power to a traction motor 410 (FIGS. 4–9) located in a motor compartment 400 and connected to a steerable wheel 25 located at the left rear corner of the power unit 15 and to hydraulic motors, for example the motor of a motor-pump assembly (FIG. 10), which supply power to several different systems within the truck 10. A caster wheel 30 is mounted at the right rear corner of the power unit 15. A pair of outriggers 35 support the front end of the truck 10.

A mast assembly 40 mounted to the front of the truck 10 includes an overhead guard 45. A pair of forks 50 are carried on a fork carriage mechanism 55 which is carried on extendable mast elements 60. The fork carriage mechanism 55 may include a reach mechanism to allow the forks 50 to be extended forward of the mast assembly 40, a side shift mechanism to permit the forks 50 to be moved from side to side relative to the mast assembly 40, and a tilt mechanism to permit the forks 50 to be tilted relative to horizontal.

In the operator's compartment 70 are mounted a steering tiller 75 for controlling the direction of travel of the truck and a control handle 80 for controlling the speed of travel and the forward and reverse direction of the truck 10 as well as fork height, fork extension, and fork tilt and side-shift.

Also located within the operator's compartment 70 is a seat assembly 90 which is attached to the right side 92 of the power unit 15, as shown. The seat assembly 90 includes a back rest 95, a seat 100, and a perch or shelf 105. The seat assembly is vertically adjustable for operator comfort. An armrest 110 is also supported on the seat assembly 90 for movement therewith. The control handle 80 is mounted on an arm 115 extending from the armrest 110.

On the floor of the operator's compartment 70 are two pedals 120 and 125. The left-hand pedal 120 operates an electric switch to control braking of the truck while the right-hand pedal 125 operates a power switch indicating the presence of the operator's foot thereon. Also located within the operator's compartment are three additional pedals: a pedal 130, corresponding to pedal 120; a pedal 135, corresponding to pedal 125; and a pedal 140, which is an additional brake pedal. The operator must have one foot on and depress the pedal 120 or 130 in order for the vehicle to move; otherwise, the vehicle's brakes will be fully applied. The operator must also depress either pedal 125 or 135 in order for the vehicle to move, if it is stopped; if moving, removal of the foot from pedals 125 or 135 will cause the vehicle to coast. The switches controlled by pedals 125 and 135 are known as "presence", "cut back" or "power" switches and indicate the presence of an operator within the operator's compartment 70. The pedal 140 is an axillary brake switch; anytime the operator depresses pedal 140, the brakes of the truck 10 will be immediately applied.

An operator's console 150 provides the operator with information regarding the status of the battery voltage and may provide additional information regarding the fork height, the weight of the load on the forks, and other information to assist the operator of the truck 10.

Figure 4:
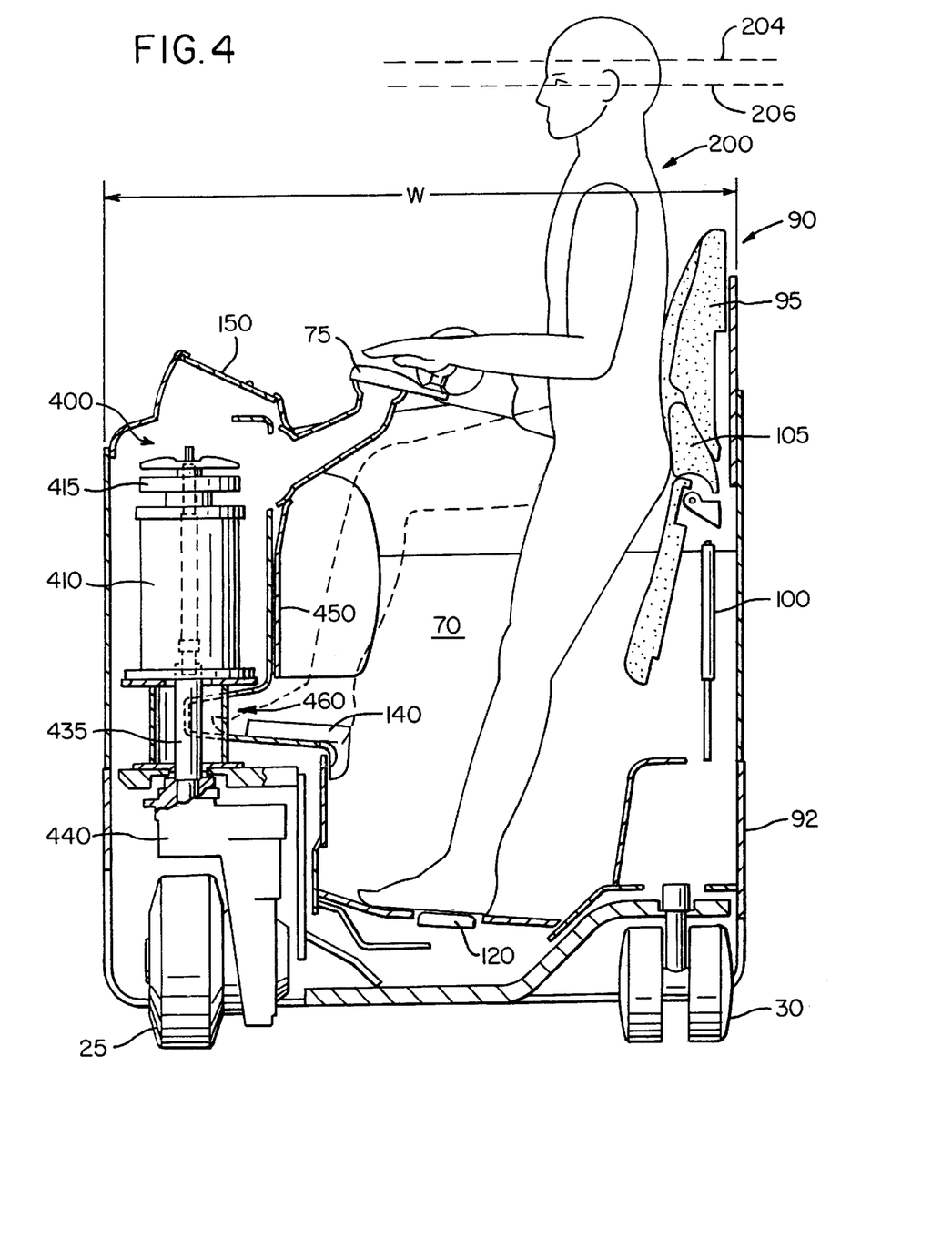
FIG. 4 is an elevational end view of the operator's compartment and motor compartment, taken partly in cross section, showing the operator in a standing position.
Figure 5:
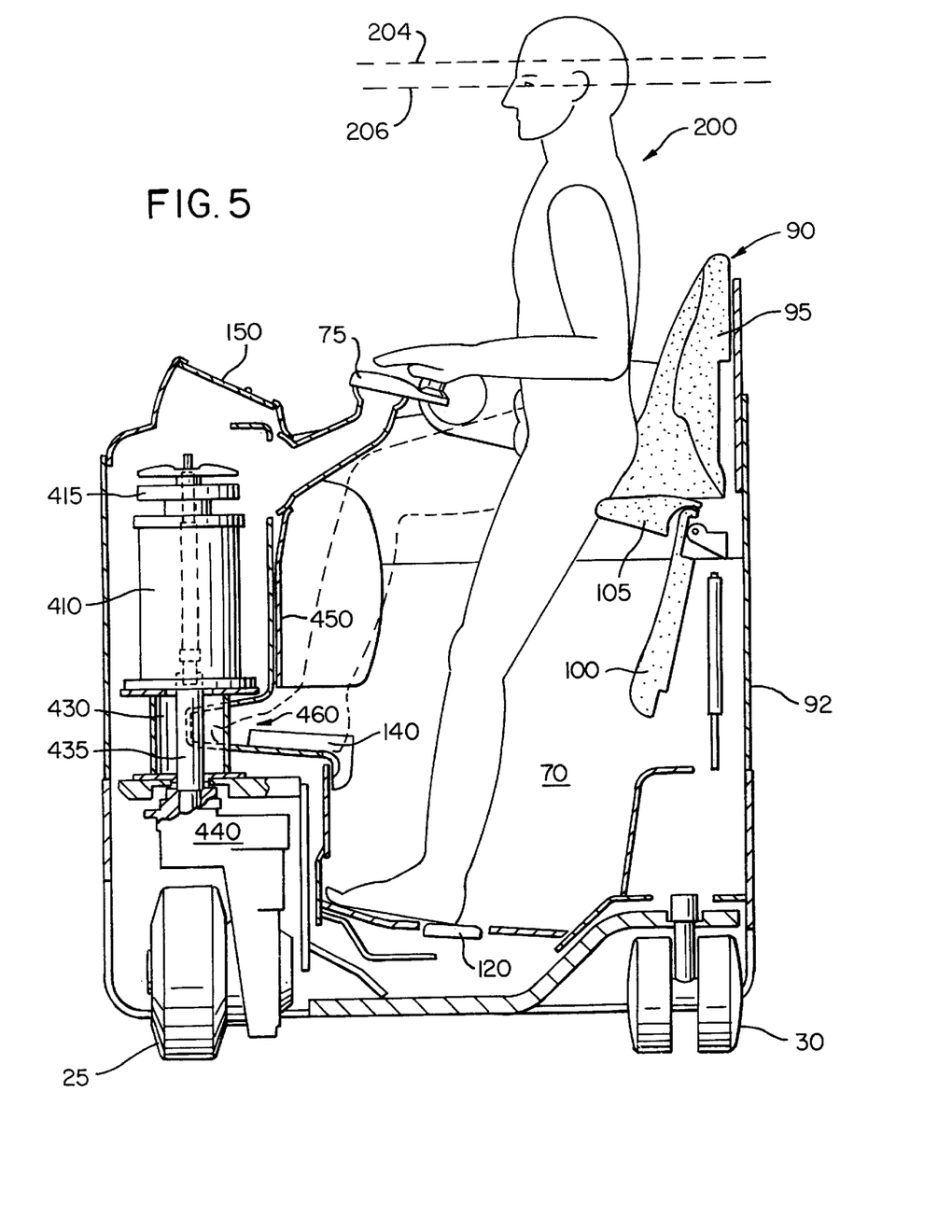
FIG. 5 is an elevational end view of the operator's compartment and motor compartment, partly in cross section, showing the operator in a perching position.
Figure 6:
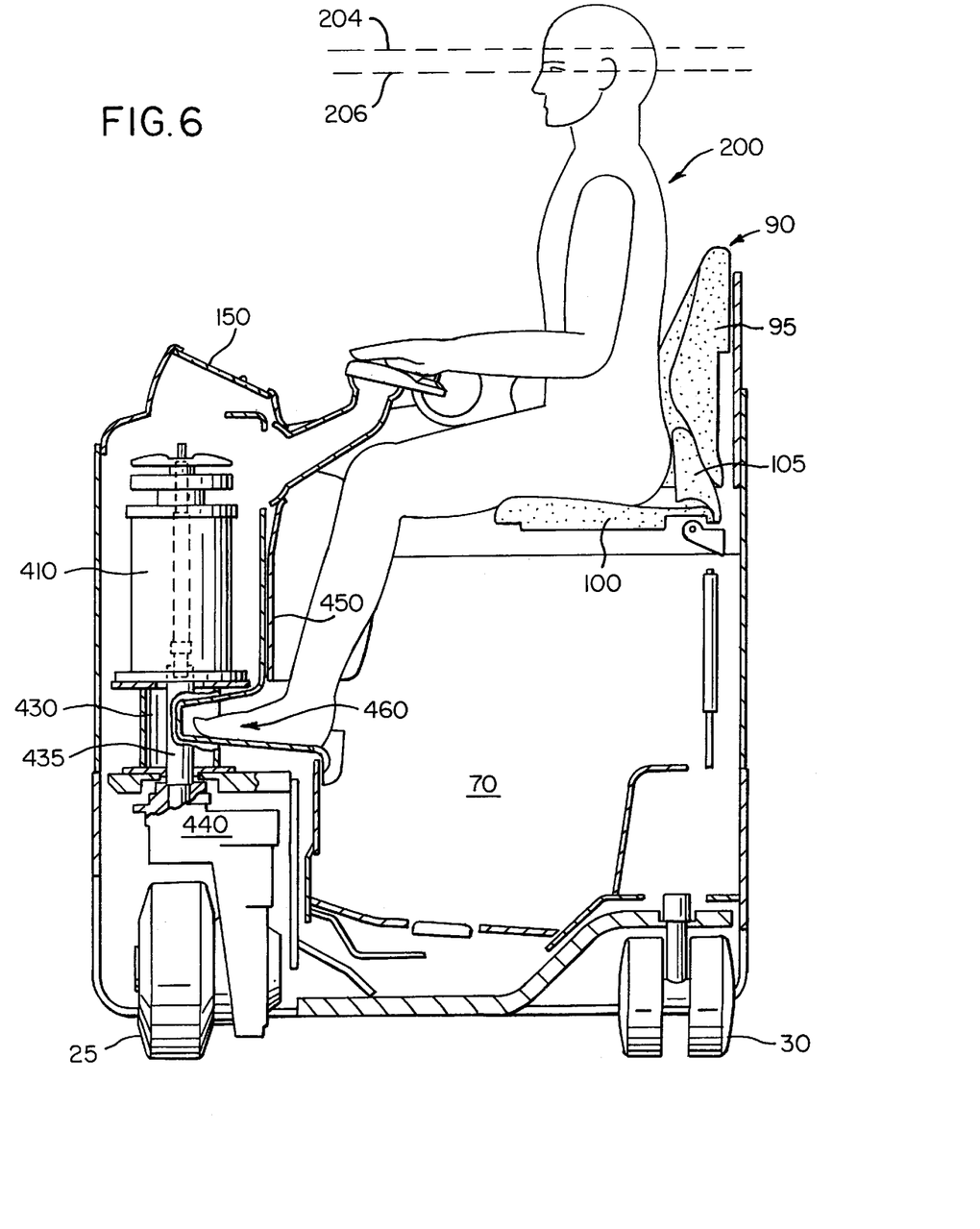
FIG. 6 is an elevational end view of the operator's compartment and motor compartment, partly in cross section, showing the operator in a sitting position.
Figure 7:
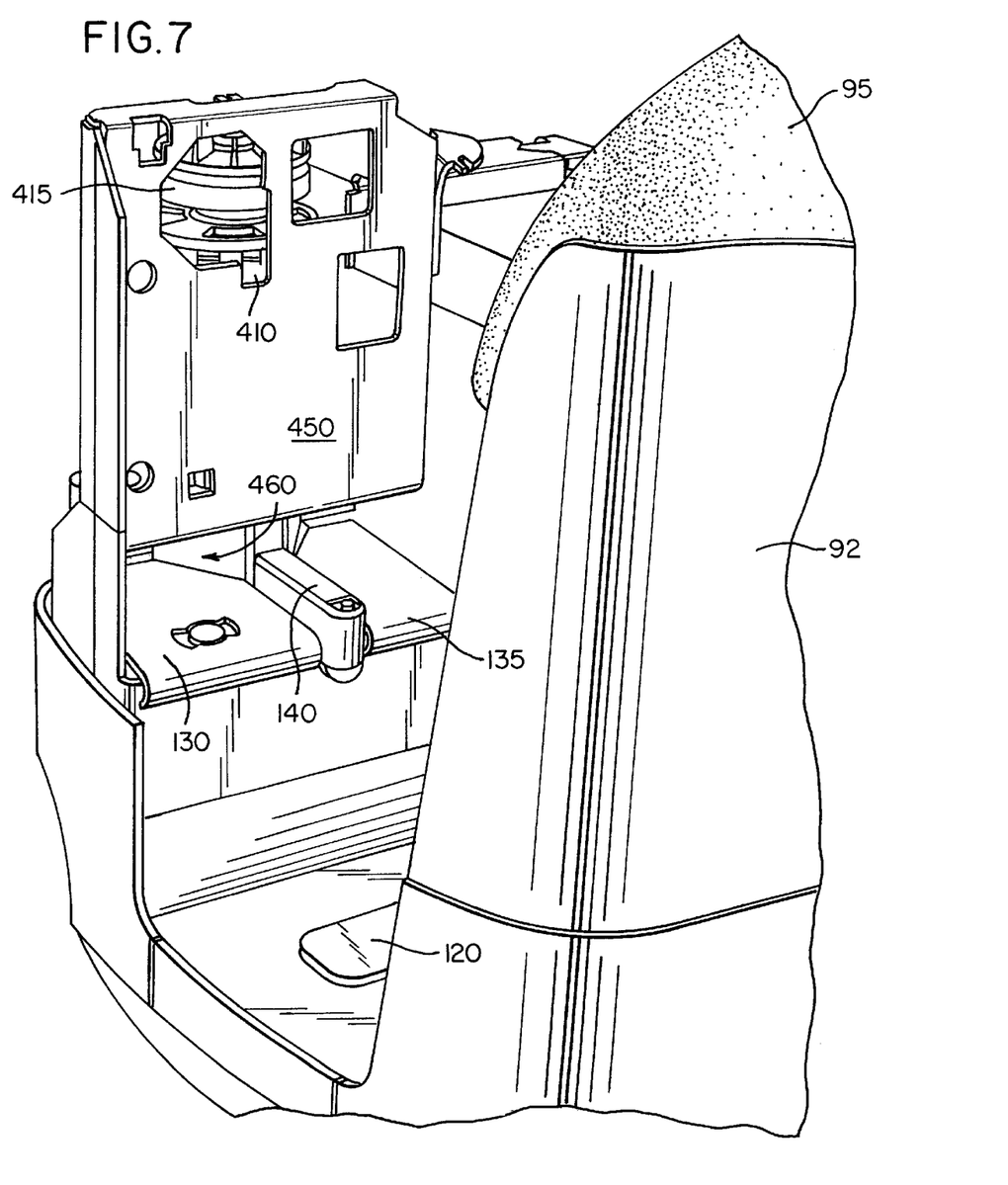
FIG. 7 is a perspective view of the operator's compartment with the housing for a control console removed and showing the elevated foot pedals.
Figure 8:
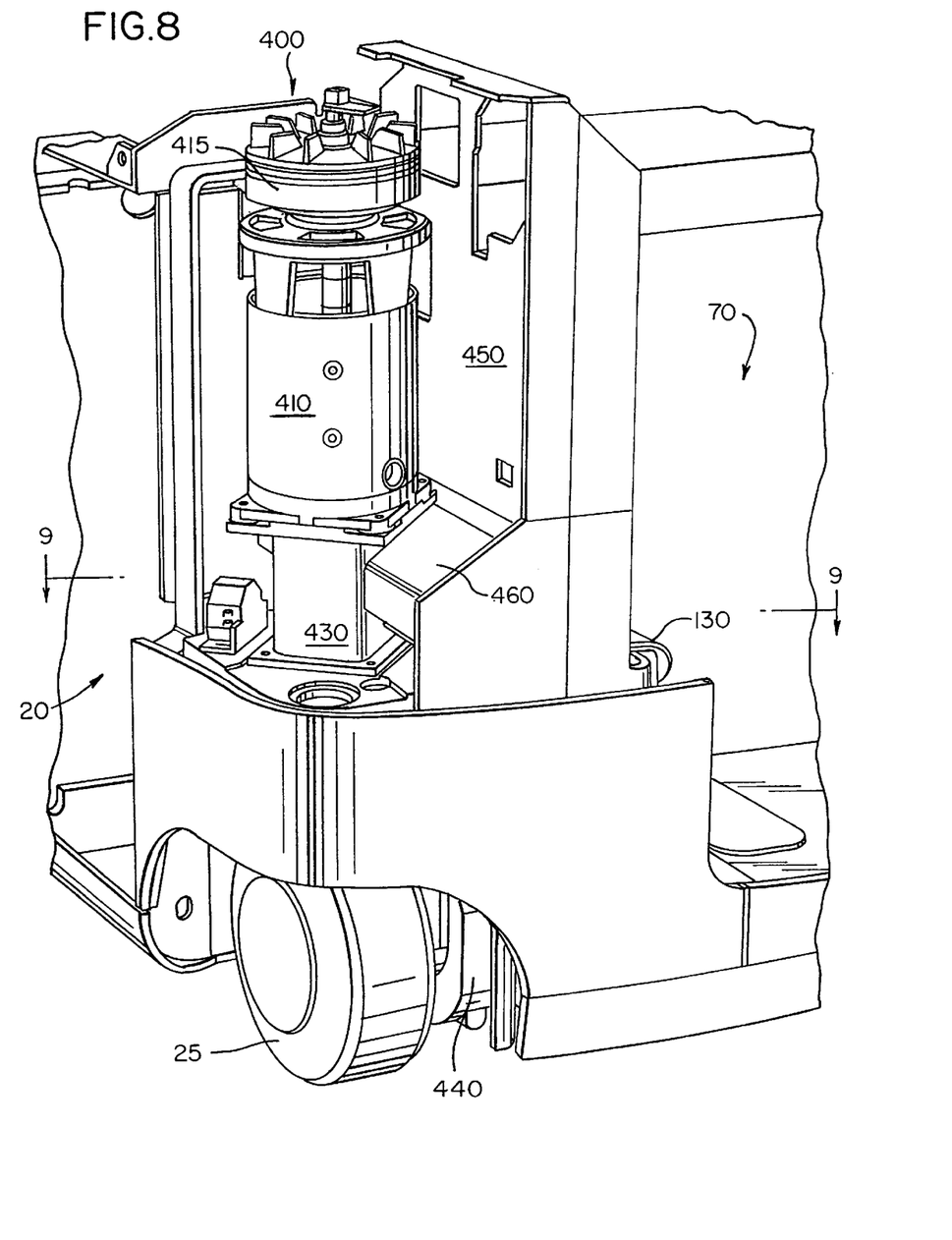
FIG. 8 is a perspective view of the motor compartment with the housing for the motor compartment and a steering motor removed.

FIGS. 4, 5, and 6 illustrate the various positions an operator 200 can assume during operation of the truck 10. FIG. 4 illustrates the stand mode of operation, FIG. 5 illustrates the perch mode of operation and FIG. 6 illustrates the sit mode of operation. In the stand mode, FIG. 4, the operator 200 is shown standing, the seat 100 is lowered, the shelf 105 is raised. In this operating mode, the operator 200 is essentially presented with a contoured, cradling surface to support the back side of the operator's body providing a fifth point of stability for the operator in addition to the hand and feet controls. The operator's feet are generally placed on the floor pedals 120 and 125, as shown.

In the perch mode of FIG. 5, the shelf 105 is lowered to the position shown. This allows the operator 200 to lean back with his/her buttocks resting on or against the shelf partially to support the weight of the body. In this mode of operation, the feet are normally moved slightly forward, therefore the operator's heels are usually placed on the floor mounted pedals 120 and 125.

The seat assembly 90 is adjustable vertically in order to place the seat assembly 90 at the vertical height that will ensure an appropriate and consistent eye level relative to the truck and the floor for each operator of the truck whether the operator is standing, perching or sitting. The dashed horizontal lines 204 and 206 in FIGS. 4–6 show the limited extent of vertical movement of the operator's eyes, provided the seat assembly 90 is properly adjusted.

If desired, the operator 200 shown in FIGS. 4 and 5 may rest one foot on the floor mounted pedals 120, 125, and the other foot on the elevated pedals 130, 135, and thus continue to operate the vehicle while changing position from time to time for variety and comfort. Additional details regarding the seat assembly may be obtained from referenced U.S. Provisional Patent Applications No. 60/057,375 filed Aug. 28, 1997 and entitled THREE POSITION SEAT ASSEMBLY FOR LIFT TRUCK; and, No. 60/058,101 filed Sep. 5, 1997 and entitled THREE POSITION SEAT ASSEMBLY FOR LIFT TRUCK.

Referring now to FIGS. 4–9, the motor compartment 400 includes a steering motor 420, a motor support or support structure 430 and the traction motor 410 on which is mounted a brake 415. The steering motor 420 has been removed in FIG. 8 in order to better show the support structure 430. In a conventional reach truck, the traction motor 410 is mounted directly on a gear box 440 which is rotated by the steering motor 420 to control the direction of travel of the truck. The traction motor 410 is relatively large in diameter in order to deliver the power necessary to move a loaded truck, therefore the space available for expansion of the operator's compartment is limited.

A primary consideration in the design of fork lift trucks, such as a rider reach truck, is the width of the truck which, to a great extent, is limited by the width of existing aisles in warehouses. Generally speaking, fork lift trucks, like those of the type shown in the drawings, are limited to a width W, see FIGS. 1 and 4, of approximately 48 inches. However, when the operator is provided with the option of sitting while operating the truck, the operator's compartment must be made wide enough to permit the operator to sit comfortably within the compartment. For example, in the case of a rider reach truck in which the operator can stand, perch or sit as previously described, the operator's compartment must be made wide enough to permit the operator's feet to be placed on elevated auxiliary pedals when the operator is seated so that the operator's eyes can be maintained at substantially the same level as when the operator is standing or perching.

Since the total width W of the truck is the sum of the motor compartment and the operator's compartment, it follows that the operator's compartment cannot be expanded without infringing on the space occupied by the motor compartment, and particularly the space occupied by the traction motor. As shown in the truck 10 of FIGS. 4–9 which includes the invention of the present application, the operator's feet extend into the space occupied by the motor compartment 70. This is enabled in the present invention by installing a motor support structure 430, which occupies a smaller space than the motor itself.

The motor support structure 430 is square in cross section and is sufficiently strong to support the motor and the torque imposed on it when the motor is either supplying power to the wheel 25, or braking the truck 10. Preferably as illustrated, a corner of the motor support structure 430 is directed toward the operator's compartment 70 to expand the space available for extension of the operator's compartment 70 into the motor compartment 400. Of course, other geometric cross sections or cross sections having at least one extension which narrows to a terminal end can be used for the motor support. For such alternates, the terminal end of the extension is directed toward the operator's compartment. A shaft 435 connects the motor 410 to the gear box 440.

Figure 9:
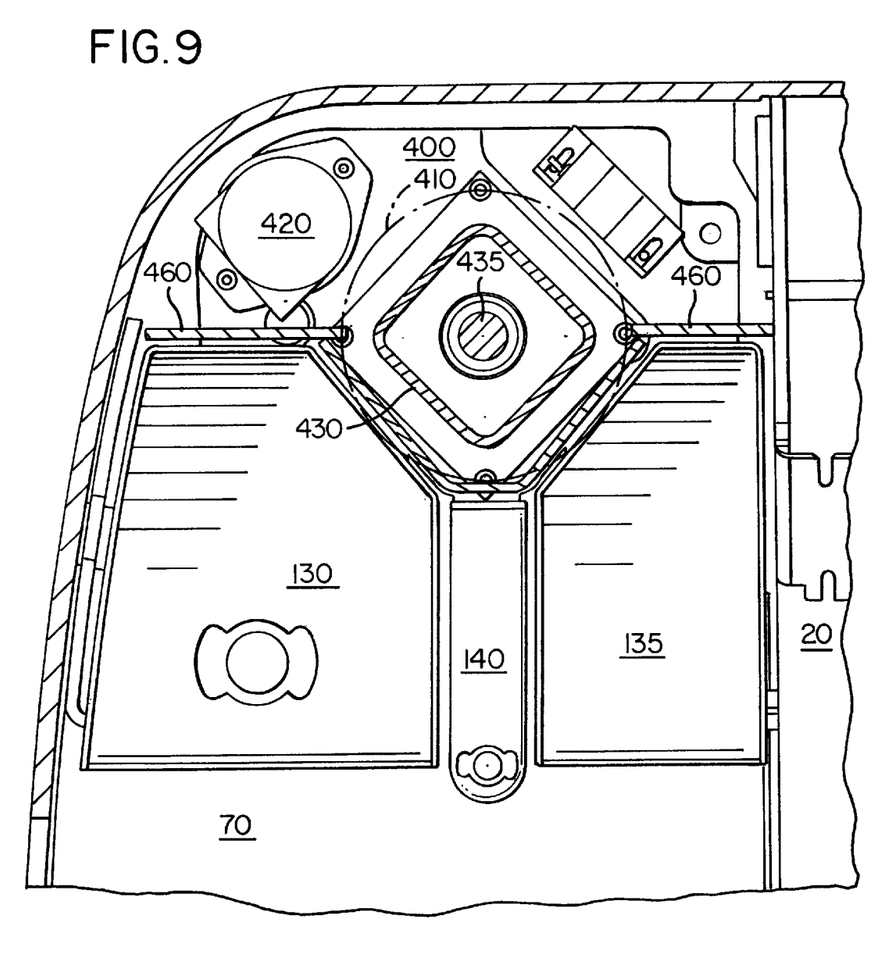
FIG. 9 is a plan view, partly in cross section taken along a horizontal plane passing through the section line 9—9 of FIG. 8, showing the relationship between a traction motor, a traction motor support and the elevated foot pedals.

The knee wall 450 of the operator's compartment is recessed into the motor compartment 70 at a recessed knee wall section 460. The outline of the motor 410 is shown in FIG. 9, as is the cross-section of the motor support structure 430. The recessed knee wall section 460 is shown extending into the motor compartment 70 to approximately the center line of the motor 410 at the center of the pedals 130, 135.

Figure 10:
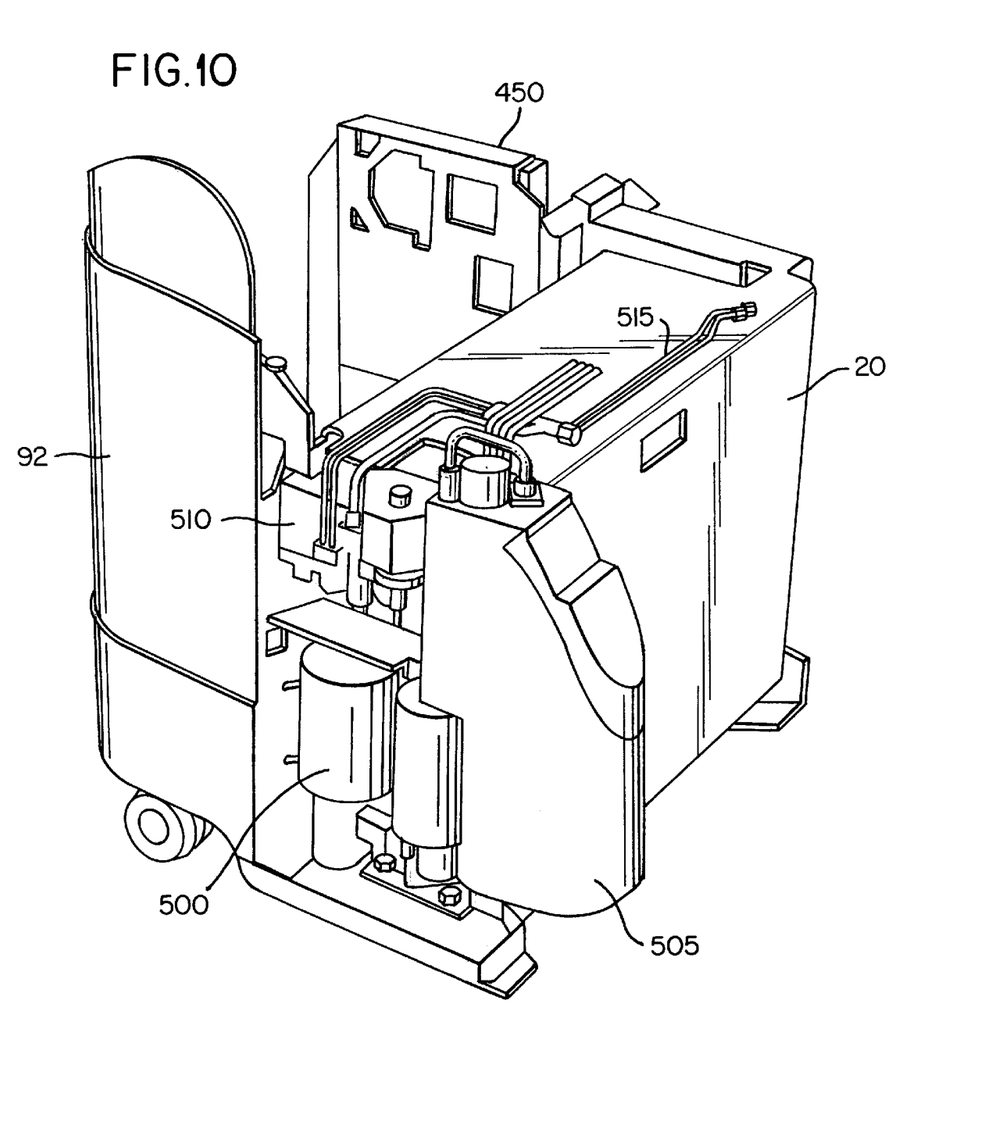
FIG. 10 is a perspective view of a battery and hydraulic system of the rider reach truck of FIG. 1.

FIG. 10 shows the location of the hydraulic system of the truck 10. Included in the hydraulic system are a motor-pump assembly 500, a hydraulic reservoir 505, a manifold 510 and hydraulic lines 515. The hydraulic system is placed on the right side of the truck adjacent to the battery compartment 20 and under the armrest 110. This location provides several advantages, removing pump and motor heat and noise from the operator, improved service access, and the addition of a gusset for the battery compartment 20. Also, as is apparent from the drawings, this positioning of the battery compartment and the hydraulic system, i.e., adjacent to one another across the width of the truck and ahead of the operator's compartment and the motor compartment, ensures that there is no encroachment into the operator's compartment which might otherwise interfere with its expansion.

Having thus described the invention of the present application in detail and by reference to preferred embodiments thereof, it will be apparent that modifications and variations are possible without departing from the scope of the invention defined in the appended claims.

What is claimed is:

1. A materials handling vehicle having a power unit and comprising:
    an operator's compartment having a floor;
    a motor compartment, said operator's compartment and said motor compartment being positioned adjacent to one another across a width of said vehicle so that an operator of said materials handling vehicle faces said motor compartment when operating said materials handling vehicle from a normal operating position; and
    an extension into said motor compartment in a direction forward from said operator to expand said operator's compartment so as to define a foot receiving cavity and a foot rest spaced above said floor of said operator's compartment, said extension being located so that forward portions of said operator's feet can extend into space normally required by said motor compartment whereby a portion of said motor compartment extends above said foot receiving cavity and a portion of said motor compartment extends below said foot receiving cavity above said floor.

2. A materials handling vehicle as claimed in claim 1 wherein said extension into said motor compartment provides space for elevated pedals for controlling said vehicle.

3. A materials handling vehicle as claimed in claim 1 further comprising:
    a gear box mounted beneath said motor compartment;
    a traction motor mounted within said motor compartment; and
    a motor support mounted within said motor compartment and being interposed between said gear box and said traction motor, said motor support having a cross section less than said traction motor to thereby provide space within said motor compartment for said extension of said operator's compartment into said motor compartment.

4. A materials handling vehicle as claimed in claim 3 further comprising a shaft mounted within said motor support for coupling said traction motor to said gear box.

5. A materials handling vehicle having a power unit and comprising:
    an operator's compartment;
    a motor compartment, said motor compartment and said operator's compartment being positioned adjacent to one another across a width of said vehicle at the rear of said vehicle; and
    an extension into said motor compartment to expand said operator's compartment, said extension being located so that an operator's feet can extend into space normally required by said motor compartment, said vehicle further comprising:
    a battery compartment; and
    a hydraulic system, said battery compartment and said hydraulic system being positioned adjacent to one another across said width of said vehicle and entirely ahead of said operator's compartment and said motor compartment, said battery compartment and said hydraulic system being thus positioned to be clear of said operator's compartment.

6. A materials handling vehicle having a power unit and comprising:
    an operator's compartment:
    a motor compartment, said operator's compartment and said motor compartment being positioned adjacent to one another across a width of said vehicle; and
    an extension into said motor compartment to expand said operator's compartment, said extension being located so that an operator's feet can extend into space normally required by said motor compartment said extension of said operator's compartment into said motor compartment comprising two extensions adjacent to and on opposite sides of said motor support to provide space within said motor compartment for elevated pedals for controlling said vehicle.

7. A materials handling vehicle as claimed in claim 6 wherein said cross section of said motor support is square and said motor support is positioned within said motor compartment so that a corner of said motor support is directed toward said operator's compartment.

8. A materials handling vehicle as claimed in claim 6 wherein said cross section of said motor support includes at least one extension which narrows to a terminal end of said extension, said motor support being positioned within said motor compartment so that said terminal end of said extension is directed toward said operator's compartment.

9. A materials handling vehicle as claimed in claim 6 wherein said cross section of said motor support comprises at least one corner which corner of said motor support is directed toward said operator's compartment.

10. A method of making a materials handling vehicle including an operator's compartment having a floor, a motor compartment, and a gear box mounted beneath said motor compartment, said operators compartment and said motor compartment being positioned adjacent to one another across a width of said vehicle so that an operator of said materials handling vehicle faces said motor compartment when operating said materials handling vehicle from a normal operating position, said method comprising the steps of:

providing a motor support;

mounting said motor support within said motor compartment adjacent to said gear box;

mounting a traction motor within said motor compartment on said motor support;

coupling said traction motor to said gear box through said motor support which has a cross section which is smaller than a cross section of said traction motor to thereby provide space within said motor compartment for an extension of said operator's compartment into said motor compartment adjacent to said motor support; and locating said extension in a direction forward from said operator to expand said operators compartment so as to define a foot receiving cavity and a foot rest spaced above said floor of said operator's compartment and so that forward portions of said operator's feet can extend into space normally required by said motor compartment whereby a portion of said motor compartment extends above said foot receiving cavity and a portion of said motor compartment extends below said foot receiving cavity above said floor.

11. A method of making a materials handling vehicle as claimed in claim 10 wherein said motor support is square in cross section and said method further comprises the step of positioning said motor support within said motor compartment so that a corner of said motor support is directed toward said operator's compartment.

12. A method of making a materials handling vehicle as claimed in claim 10 wherein said motor support has a cross section comprising at least one corner and said method further comprises the step of positioning said motor support within said motor compartment so that said at least one corner of said motor support is directed toward said operator's compartment.

13. A method of making a materials handling vehicle as claimed in claim 10 wherein said motor support has a cross section comprising at least one extension which narrows to a terminal end of said extension and said method further comprises the step of positioning said motor support within said motor compartment so that said at least one extension of said motor support is directed toward said operator's compartment.

14. A method of making a materials handling vehicle including an operator's compartment, a motor compartment, a battery compartment, a hydraulic system and a gear box mounted beneath said motor compartment, said operators compartment and said motor compartment being positioned adjacent to one another across a width of said vehicle, said method comprising the steps of:

providing a motor support;

mounting said motor support within said motor compartment adjacent to said gear box;

mounting a traction motor within said motor compartment on said motor support;

coupling said traction motor to said clear box through said motor support which has a cross section which is smaller than a cross section of said traction motor to thereby provide space within said motor compartment for an extension of said operator's compartment into said motor compartment adjacent to said motor support, locating said extension so that an operator's feet can extend into space normally required by said motor compartment; and positioning said battery compartment and said hydraulic system adjacent to one another across said width of said vehicle and entirely ahead of said operator's compartment and said motor compartment, said battery compartment and said hydraulic system being thus positioned such that they are clear of said operator's compartment.

\* \* \* \* \*

UNITED STATES PATENT AND TRADEMARK OFFICE
CERTIFICATE OF CORRECTION

PATENT NO. : 6,182,778 B1
DATED : February 6, 2001
INVENTOR(S) : Robert J. Henshaw, Randall D. Plaugher, Patrick A. Tebbe It is certified that error appears in the above-identified patent and that said Letters Patent is hereby corrected as shown below:

<u>Column 7, claim 10,</u>
Line 22, "operators" should read -- operator's --.

<u>Column 8, claim 14,</u>
Line 14, "operators" should read -- operator's --.
Line 24, "clear box" should read -- gear box --.
Lines 30-32, "support, locating said extension so that an
    operator's feet can extend into space normally required by said motor
        compartment; and"

should read:

-- support;
    locating said extension so that an operator's feet can extend into space
        normally required by said motor compartment; and --.

Signed and Sealed this

Twenty-sixth Day of March, 2002

Attest:

*Attesting Officer*

JAMES E. ROGAN
*Director of the United States Patent and Trademark Office*